US008156178B2

(12) United States Patent
Chandra

(10) Patent No.: US 8,156,178 B2
(45) Date of Patent: Apr. 10, 2012

(54) METHOD AND SYSTEM FOR ENHANCING A HOME PAGE

(76) Inventor: Rohit Chandra, Sunnyvale, CA (US)

( * ) Notice: Subject to any disclaimer, the term of this patent is extended or adjusted under 35 U.S.C. 154(b) by 599 days.

(21) Appl. No.: 11/682,274

(22) Filed: Mar. 5, 2007

(65) Prior Publication Data

US 2007/0299938 A1     Dec. 27, 2007

Related U.S. Application Data

(60) Provisional application No. 60/815,467, filed on Jun. 22, 2006.

(51) Int. Cl.
*G06F 15/16* (2006.01)
*G06F 3/00* (2006.01)
(52) U.S. Cl. ........ 709/203; 709/217; 709/219; 709/227; 715/748
(58) Field of Classification Search .................. 709/202, 709/227, 203
See application file for complete search history.

(56) References Cited

U.S. PATENT DOCUMENTS

| 6,065,057 | A  | * | 5/2000  | Rosen et al. .................. 709/229 |
| 6,240,444 | B1 | * | 5/2001  | Fin et al. ........................ 709/205 |
| 6,490,602 | B1 | * | 12/2002 | Kraemer ......................... 715/236 |
| 6,850,986 | B1 | * | 2/2005  | Peacock ......................... 709/232 |
| 2002/0007379 | A1 | * | 1/2002  | Wang et al. .................... 707/515 |
| 2002/0035672 | A1 | * | 3/2002  | Challenger et al. ........... 711/122 |
| 2002/0069296 | A1 | * | 6/2002  | Aua et al. ....................... 709/246 |
| 2004/0221006 | A1 | * | 11/2004 | Gopalan et al. ............... 709/203 |
| 2007/0234209 | A1 | * | 10/2007 | Williams ....................... 715/700 |

* cited by examiner

*Primary Examiner* — Jeffrey Pwu
*Assistant Examiner* — Jasmine Myers
(74) *Attorney, Agent, or Firm* — SNR Denton US LLP

(57) ABSTRACT

URL or address associated with a user's home page is modified in such manner as to cause a web browser application to direct a request to a server that hosts a highlighting service, which service is invoked to display highlights on the version of the home page returned to the user. In one embodiment this is accomplished without requiring a user to download client-side application software. In another embodiment this is accomplished without requiring the user to register for the new service. In a third embodiment, the user has to neither download application software, nor register for the service.

4 Claims, 10 Drawing Sheets

METHOD AND SYSTEM FOR ENHANCING A HOME PAGE

RELATED APPLICATIONS

The present application claims the benefit of the filing date of U.S. Provisional Patent Application with Ser. No. 60/815,467, filed on Jun. 22, 2006.

FIELD

The present invention relates generally to an apparatus and method for enhancing a home page and other web pages viewed during a web browsing session. More particularly, the invention provides a simple and effective mechanism to manipulate a URL to automatically invoke enhanced functionality to work with a user's existing home page.

BACKGROUND

A wide variety of add-on software applications have been developed to provide a user with additional functionality during a web browsing session. For instance, one such application is the Alexa Toolbar developed and provided by Alexa Internet, Inc. The Alexa Toolbar is an add-on software application that works in conjunction with a web browser application to provide information, including traffic rankings, associated with the web page that a user is viewing. The traffic ranking for a particular web page is based, at least in part, on the number of other users who have viewed the particular web page. In this way, the Alexa Toolbar provides the user a function or service that works with and enhances web pages viewed in the user's web browser window.

The Alexa Toolbar is but one example of a number of add-on software applications that provide some additional functionality to a user during a web browsing session. One of the problems with such add-on software applications is they require the user to download and install client-side software. This is problematic for a variety of reasons. First, a user may choose not to install a new software application out of fear that it will be bundled with one or more unwanted, obtrusive and/or malicious applications, such as adware or malware. Second, many less sophisticated users simply lack the knowledge and confidence to download and install add-on applications. Finally, the user may not have the requisite system privileges to install new software applications. Consequently, a simpler and less obtrusive mechanism for providing enhanced functionality for a web browsing session is desirable.

SUMMARY

A method and apparatus for enhancing a home page (also called a "start page") by modifying the URL or address associated with the home page are disclosed. Specifically, the URL or address associated with a user's home page is modified in such manner as to cause the web browser application to direct a request to a computing device that is enabling a service to enhance the functionality on the original home page. In accordance with one embodiment of the invention, a user interface object (e.g., a hyperlink, or graphical button) is provided. The user interface object is associated with a set of instructions such that, upon detecting a specific action on the user interface object by the user, a client computer executes the instructions, thereby causing the client computer to modify the URL for the home page of a web browser application. In another embodiment, the user is simply provided instructions on how to modify the address associated with his or her home page. In yet another embodiment, the address or URL is modified in a manner that is transparent to the user, for example, by executing a downloaded application, or directly from a server. In any case, upon invoking the modified home page address, the actual home page viewed is essentially the same as before, but the service is invoked to enhance the functionality on the existing home page. In one embodiment this is accomplished without requiring a user to download client-side application software. In another embodiment this is accomplished without requiring the user to register for the new service. In a third embodiment, the user has to neither download application software, nor register for the new service.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Figure 1:
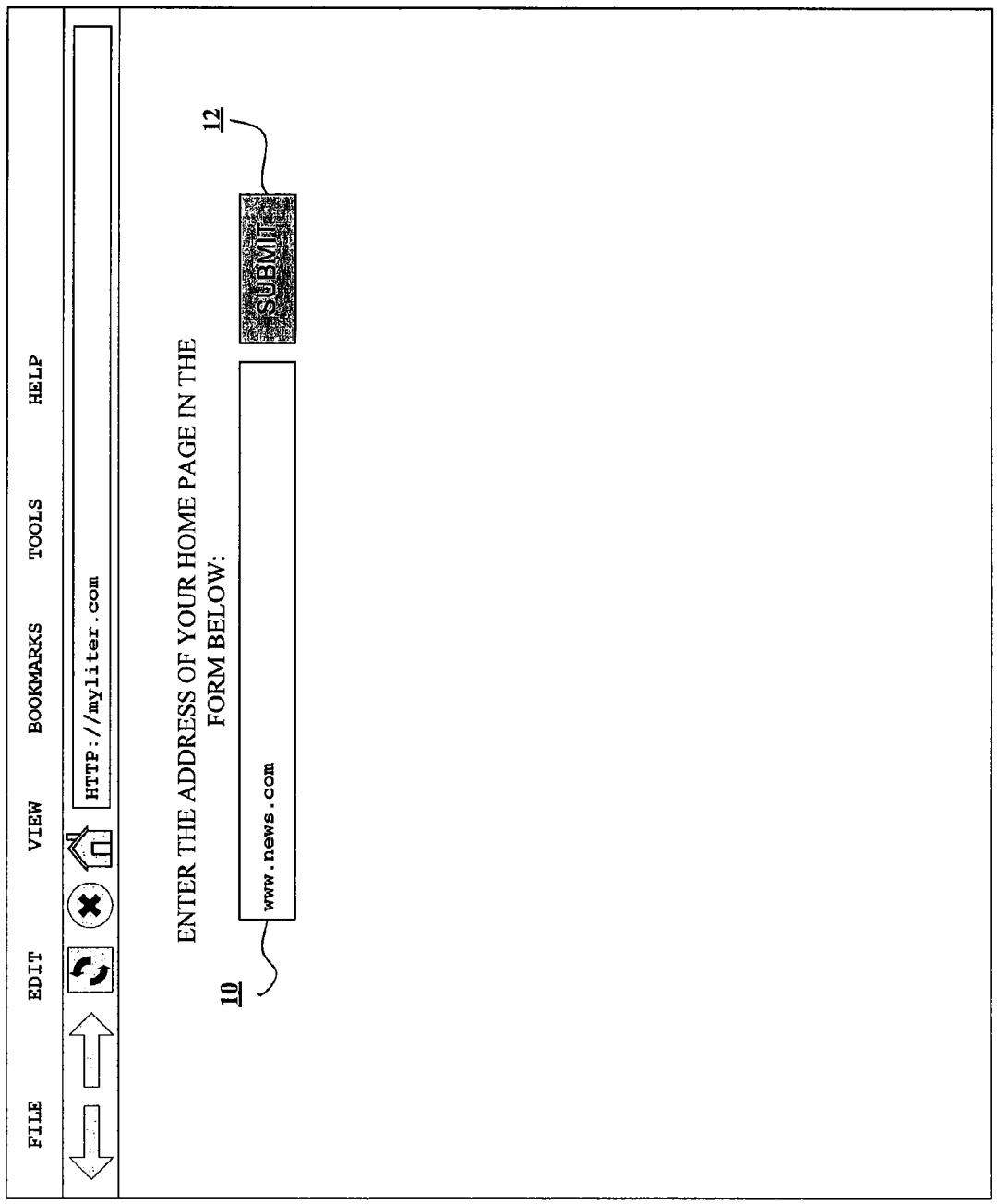
FIGS. 1 and 2 illustrate examples a user interface object in the form of a graphical button, according to an embodiment of the invention.

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description.

As used herein, the term "URL" is an identifying mechanism associated with an internet document or web page. As such, URL is interchangeable with address, document address, or web page address. Furthermore, a home page address, which is often referred to as a start page address, is simply a default address used by a web browser application when a web browsing session is first initiated.

Consistent with an embodiment of the invention, a method and apparatus for enabling a service to provide a user with additional functionality during a web browsing session are disclosed. The enhanced functionality is enabled by modifying the URL corresponding to a user's home page address. For example, instructions may be provided, or a user interface object may be provided such that, when a user follows the instructions or operates (e.g., selects or interacts with) the user interface object, it causes the URL corresponding to the user's home page address to be modified. The resulting modified URL, when invoked by the web browser, causes a service to be enabled that operates with the user's existing home page, and other web pages viewed during the user's web browsing session. Accordingly, the service provides the user with additional functionality, without permanently installing any additional software components. Furthermore, in one embodiment, the service is configurable on a per user basis. The per user configuration, may or may not require the user to provide any personal information or the establishment of a service account.

In the description that follows, the invention is described in the context of a highlighting service. However, aspects of the invention are applicable in a wide variety of alternate applications and contexts. Accordingly, the examples provided herein are not meant to be limiting, but instead, are provided to assist the reader in understanding the principles of the invention in a particular context.

In one embodiment of the invention, the address corresponding with the user's home page is changed automatically, for example, by interacting with a user interface object. The user interface object may be a graphical button or a hyperlink on a web page. As such, the user interface object may be served (e.g., as part of a web page) by a web server associated with the service, or by a third party web server. Alternatively, the user interface object may be a button that is displayed in a portion (e.g., a toolbar or tool panel) of a user's web browser application. In any case, interaction with the user interface object causes the URL or address of the user's home page to be modified.

FIG. 1 illustrates an example of a user interface object in the form of a graphical button 12, according to an embodiment of the invention. As illustrated in FIG. 1, in one embodiment of the invention, a user may be prompted to provide the home page address or URL of his or her existing home page. In the example illustrated in FIG. 1, a user is prompted to enter the URL of his or her home page in form 10, and then select the "SUBMIT" button 12 (e.g., by clicking a pointing device button, or hitting the <Enter> key on his or her keyboard). When the user selects or "presses" the "SUBMIT" button 12, the web browser application processes the user event and modifies the address of the user's existing home page. In one embodiment, the modification of the address is transparent to the user. In an alternative embodiment, a downloaded application may analyze the user's home page address and modify the address. In any case, the modification of the address invokes a service providing enhanced functionality to the user.

Figure 2:
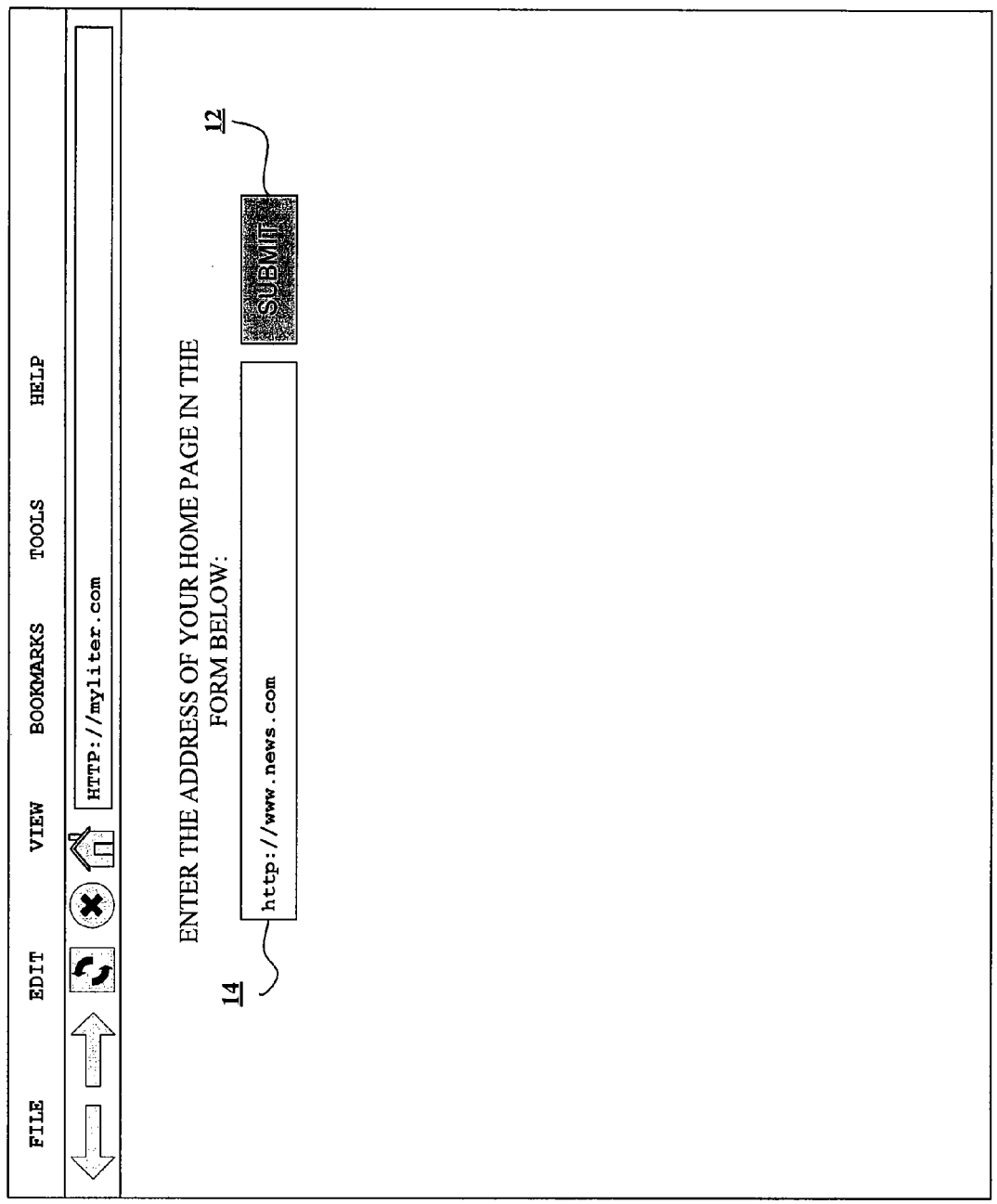

FIG. 2 is similar to FIG. 1, however, the particular format of the address 14 entered by the user is different. For example, as illustrated in FIG. 2, a user has entered the address 14 of his or her home page along with the protocol (e.g., hypertext transfer protocol (HTTP)) used to access the home page. In this example, the user has entered the address: "http://www.news.com" instead of "www.news.com". In one embodiment, various address formats and protocols are supported by the invention. Accordingly, a user-entered address may be analyzed to determine its format and appropriate action taken based upon the format.

In FIGS. 1 and 2, a user is prompted to enter the address of his or her existing or desired home page. Alternatively, the user interface object, when selected, may automatically determine the address of the user's existing home page. Accordingly, in one embodiment of the invention, the address of the user's existing home page may be modified without the user having to enter it.

In addition, or alternatively, a user may manually modify the URL or address of his or her home page according to instructions provided to the user. For instance, in one embodiment of the invention, a web page, text box, or some other means of providing instructions, may direct the user to modify the address corresponding to the user's home page in a manner described in greater detail below. Accordingly, a user may be instructed to manually type the modified address in an address box of the web browser. Similarly, a user may change the web browser's home page configuration setting manually, so that every time the web browser application is executed, the modified address is used as the default home page for the user.

Figure 3:
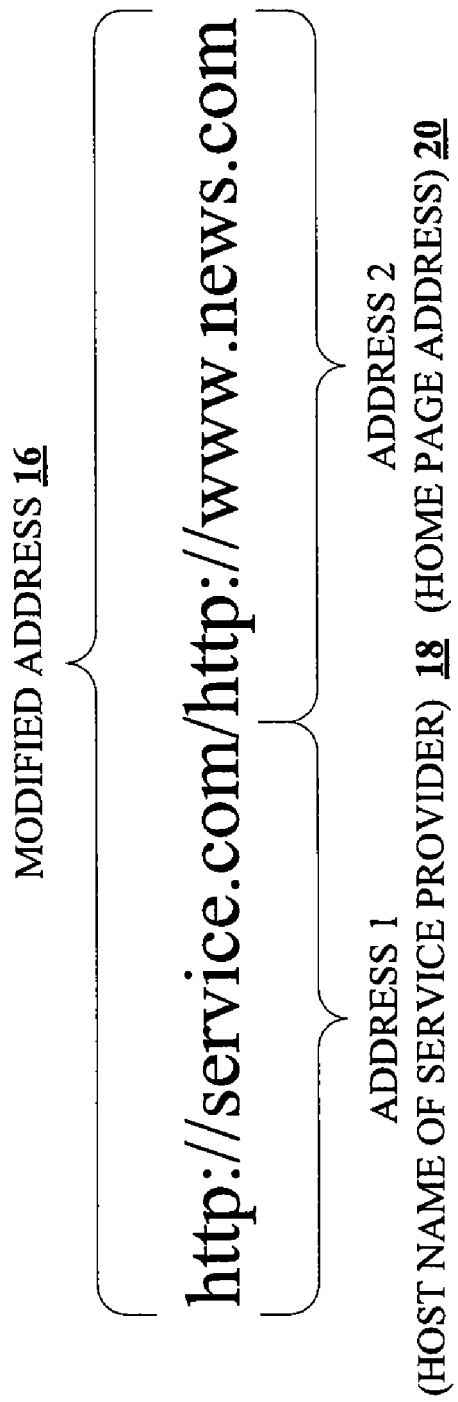
FIGS. 3 through 7 illustrate various examples of an address, or URL, that has been modified to invoke a service, according to one or more embodiments of the invention.

FIG. 3 illustrates an example of an address 16 that has been modified to enable a service, according to an embodiment of the invention. In FIG. 3, the modified address 16 includes two portions—a first portion representing a string associated with a service 18, and a second portion representing the address of the user's existing home page 20. In this example, the first portion, "http://service.com", represents the address of a server or other computing device that is enabling the service. As described in greater detail below, the service may be hosted locally, or by a remote server or computing device. When the modified address is invoked by the web browser application, a request is directed to a computing device with hostname, "service.com". The computing device analyzes the modified address, extracts the second portion representing the URL of the user's home page (which may be encoded), and then directs a request to the server hosting the user's home page. In turn, the server hosting the user's home page forwards some or all of the elements comprising the home page to either the requesting computing device—in this case the computing device hosting the service, or back to the web browser application directly; or some combination of the two. Accordingly, the computing device hosting the service is able to manipulate the user's existing home page, if necessary, prior to sending it on to the user. For example, the computing device may alter or modify elements (e.g., text, pictures, graphics, fonts, background) of the user's home page before forwarding it on to the user's web browser application.

Figure 4:
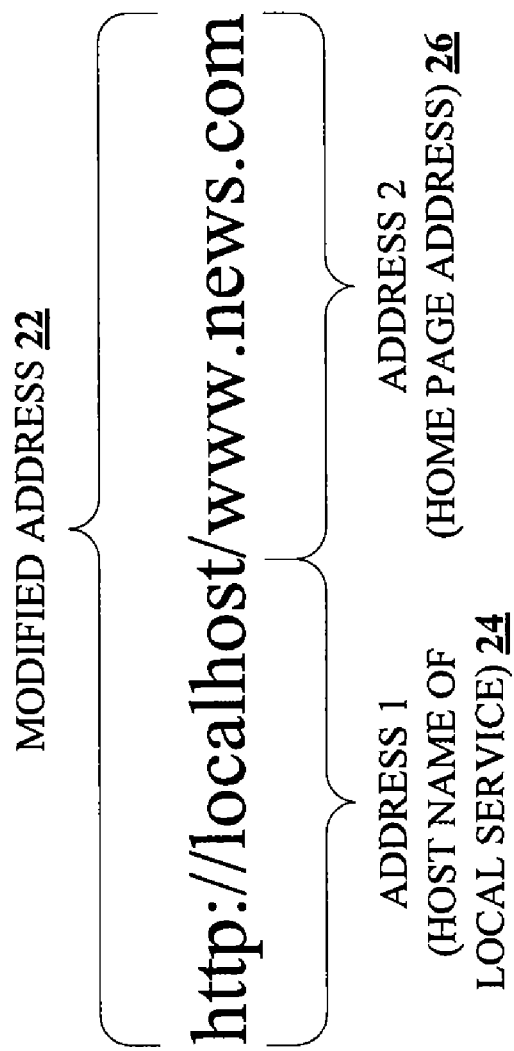

FIG. 4 illustrates another example of an address 22 that has been modified to enable a service, according to an embodiment of the invention. Similar to the modified address 18 of FIG. 3, the modified address of FIG. 4 includes two portions. In this example, however, the first portion is: "http://localhost". In one embodiment of the invention, the service that enhances the functionality of the user's home page is hosted locally, and may be invoked by directing a request to the local device. In this case, the address of the local device is associated with the hostname "localhost", such that a request directed to "localhost" will be processed by the local device.

Figure 5:
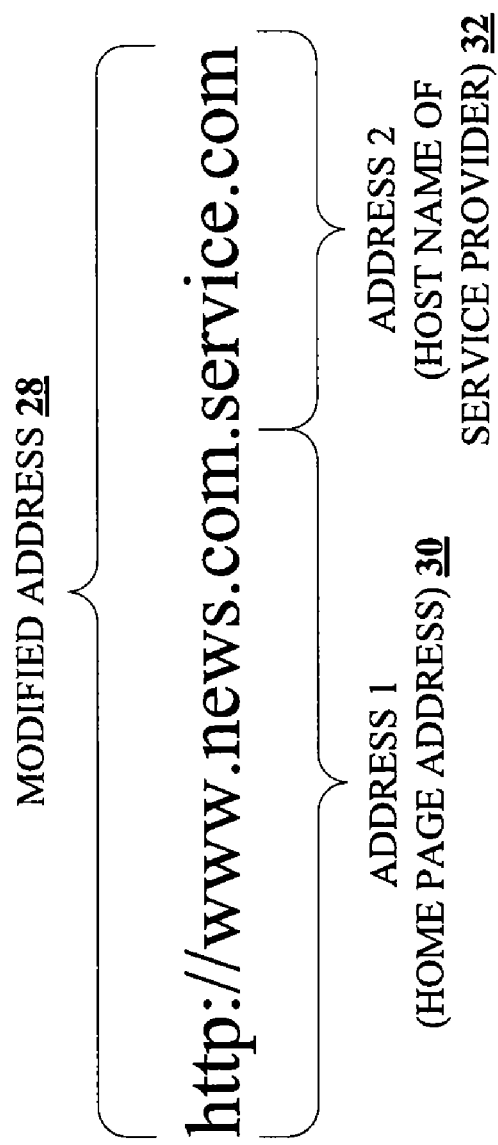

FIG. 5 illustrates yet another example of an address 28 that has been modified to enable a service according to an embodiment of the invention. In this example, the hostname 30 of the computing device providing the service (e.g., service.com) has been appended to the end of the user's home page address 32 (e.g., www.news.com). Accordingly, a request directed to the modified address (e.g., www.news.com.service.com) will be processed by the computing device associated with the hostname service.com.

Figure 6:
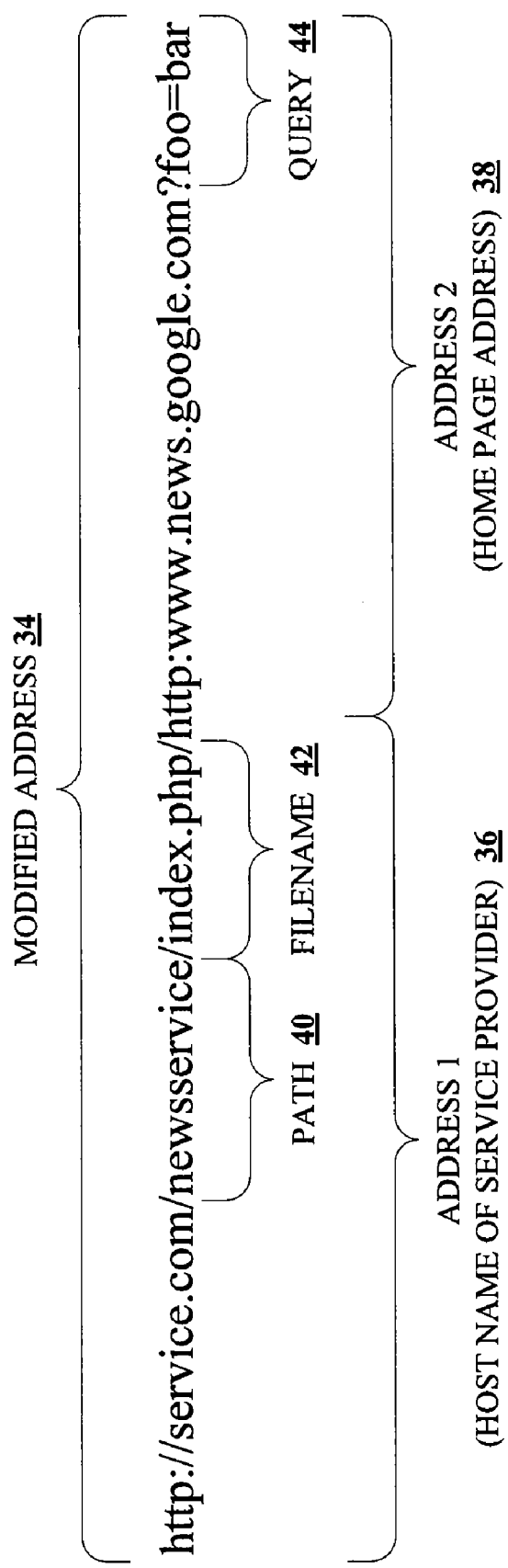
Figure 7:
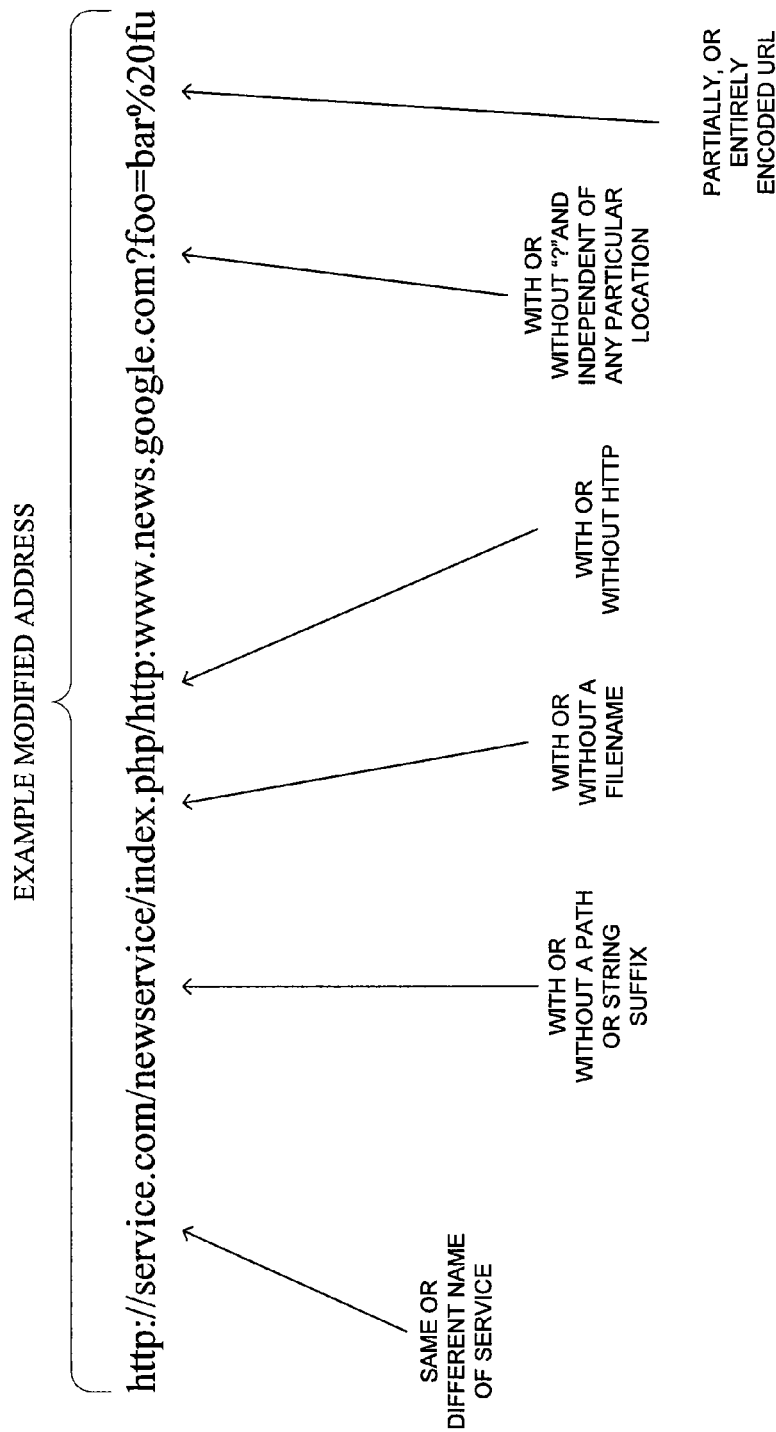

The examples of the modified URLs shown in FIGS. 3 through 5 are relatively simple. However, more complex URL formats are consistent with various embodiments of the present invention. In an alternative embodiment, the URL address format could be made up of more or less than two portions. For example, FIG. 6 illustrates a complex address 34 that has been modified to invoke a service, according to an embodiment of the invention. Similar to FIGS. 3, 4 and 5, the modified address 34 illustrated in FIG. 6 includes two portions—an address 36 associated with a service (e.g., "http://service.com/newsservice/index.php"), and an address 38 associated with a user's home page (e.g., "www.news.google.com?foo=bar"). As illustrated in FIG. 6, the address 36 of the service also includes a path 40 and filename 42 portion. Depending upon the particular embodiment, the path 40 and filename 42 portions of the modified address 36 may be optional. Similarly, in FIG. 6, the home page address portion 40 of the modified address 36 includes a query 44 portion. The query 44 portion of the modified address 36 may be optionally supported, depending on the particular embodiment of the invention. Accordingly, the invention supports and works with a wide variety of URL formats, and in general is independent of any particular address or URL format. Furthermore, the particular host names and addresses (e.g., "service.com", "localhost") used in FIGS. 3 through 6 are provided only as examples.

Figure 8:
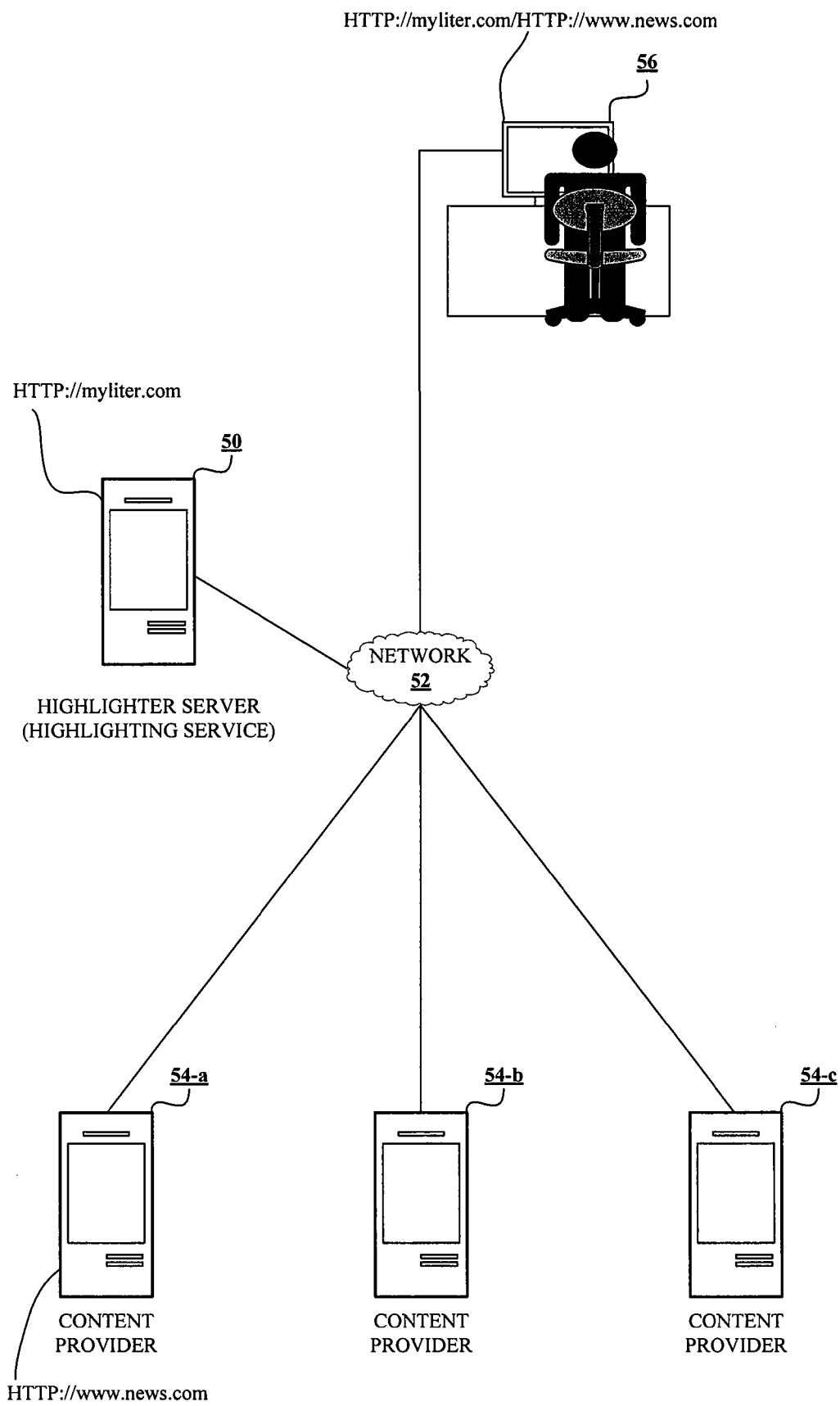
FIG. 8 illustrates an example of a network environment in which a highlighting service is provided via a server, according to an embodiment of the invention.

FIG. 8 illustrates an example of a network environment in which a highlighting service is provided via a server 50, according to an embodiment of the invention. In FIG. 8, the particular service provided by the server is a highlighting service, and accordingly, the server is referred to as a highlighter server 50 and has hostname, myliter.com. A highlighting service is a web annotation service that enables a user to highlight portions of a web page in much the same way that a user might make yellow highlights in a textbook. The highlighting server captures the highlights that a user makes to a web page, and then displays the highlights to the user when the user visits the same web page during subsequent web browsing sessions. The highlighting service enables a user to make notes on, and about a web page, or portions thereof. The service lets users categorize content and take a variety of associated actions in order to collaborate with other users, and, to effectively retrieve from in the future. Furthermore, the highlighting service may optionally enable a user to share highlights with other users. For example, a user may be able to see the highlights made by other users.

As illustrated in FIG. 8, the highlighter server 50 is communicatively coupled by means of a network 52 (e.g., the Internet) to several content provider servers 54-a, 54-b, and 54-c. In addition, the highlighter server 54 is communicatively coupled by means of the network 52 to a user's client computer 56. It will be appreciated by those skilled in the art that the computing environment illustrated in FIG. 8 is but one example, and a wide variety of computer and network configurations might be used without departing from the spirit of the invention.

Once a home page address has been modified, invoking the modified address causes the web browser application to direct a request to the highlighter server 50. For instance, in the example illustrated in FIG. 8, the user's web browser application directs a request to the highlighter server 50 at modified address, "HTTP://myliter.com/HTTP://www.news.com". The first portion of the modified URL causes the request to be serviced by the highlighter server 50 with host name "myliter.com". The highlighter server 50 analyzes the modified address, and extracts the second portion representing the address of the user's home page, "www.news.com".

Next, the highlighter server 50 forwards a request to the content provider 54-a hosting the user's existing home page. In turn, the content provider 54-a sends the data representing the user's home page back to a combination of the highlighter server 50, and the user's web browser application directly. The highlighter server 50 processes the data, and then forwards it to the user's web browser application, where the home page is ultimately displayed. In one embodiment of the invention, when processing the data, the highlighter server 50 modifies content included in the user's home page, including but not limited to: background colors, font styles, hyperlinks, paths to other objects such as images, video, and so on. Some objects may simply be passed from the highlighter server 50 to the web browser application without being modified. Consequently, when rendering the web page, the web browser application can directly request such objects from their source.

Figure 9:
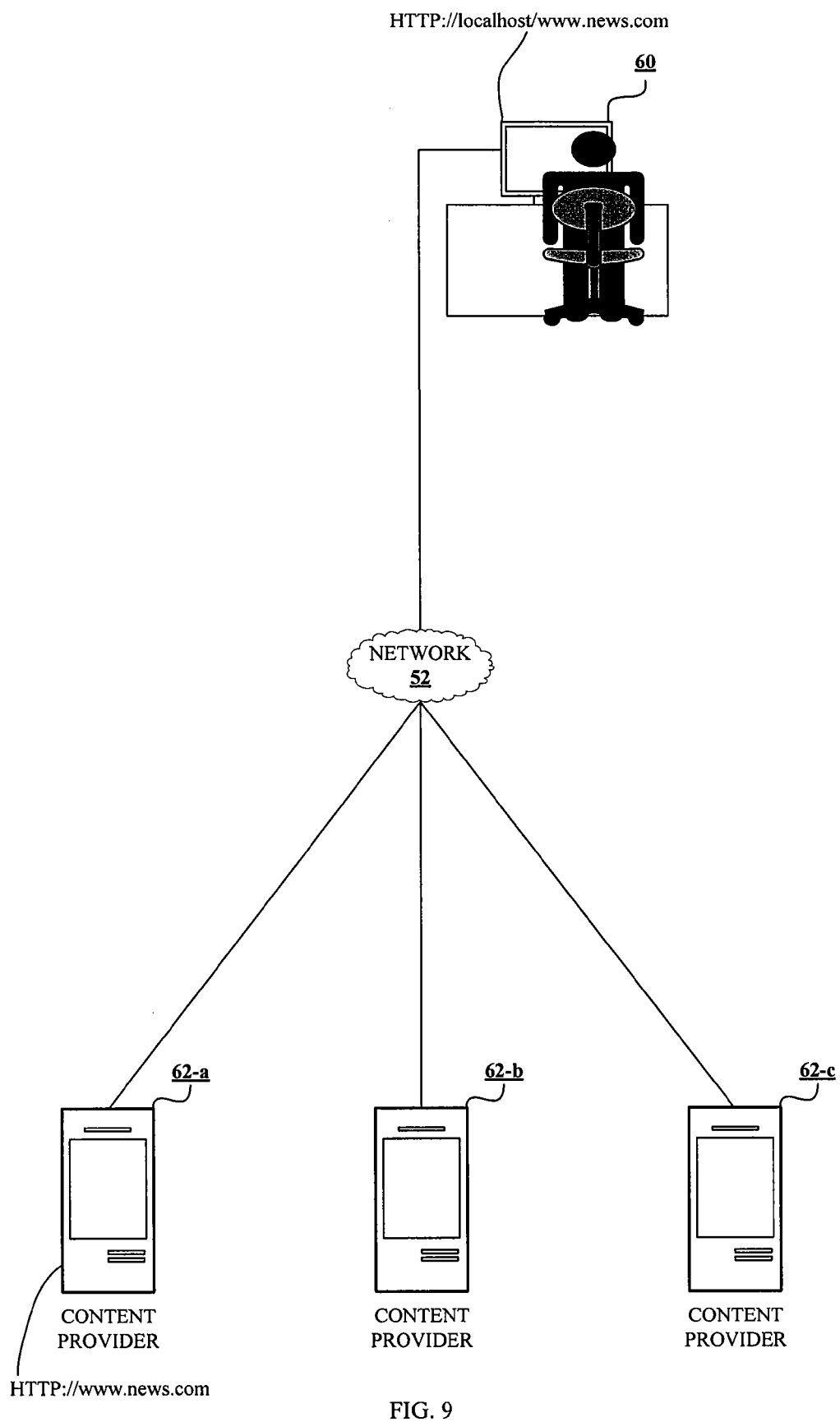
FIG. 9 illustrates an example of a network environment in which a highlighting service is provided via a local device, according to an embodiment of the invention.

FIG. 9 illustrates an example of a network environment in which a highlighting service is provided via a local device 60, according to an embodiment of the invention. As illustrated in FIG. 9, a user of computing device 60 invokes a service to provide additional functionality with his or her home page by directing a request to the modified address, "http://localhost/www.news.com". In this case, the request will be serviced locally, for example, by an application executing on the local computing device 60. If the particular service is a highlighting service, for example, a highlighting application executing on the local device 60 will process the request directed to "http://localhost/www.news.com". To invoke the highlighting service, a user may manually enter a URL or have it automatically modified, as described above in connection with FIGS. 1 and/or 2. Once invoked, the locally executing highlighting application operates in much the same way as the highlighter server 50 described in connection with FIG. 8

Figure 10:
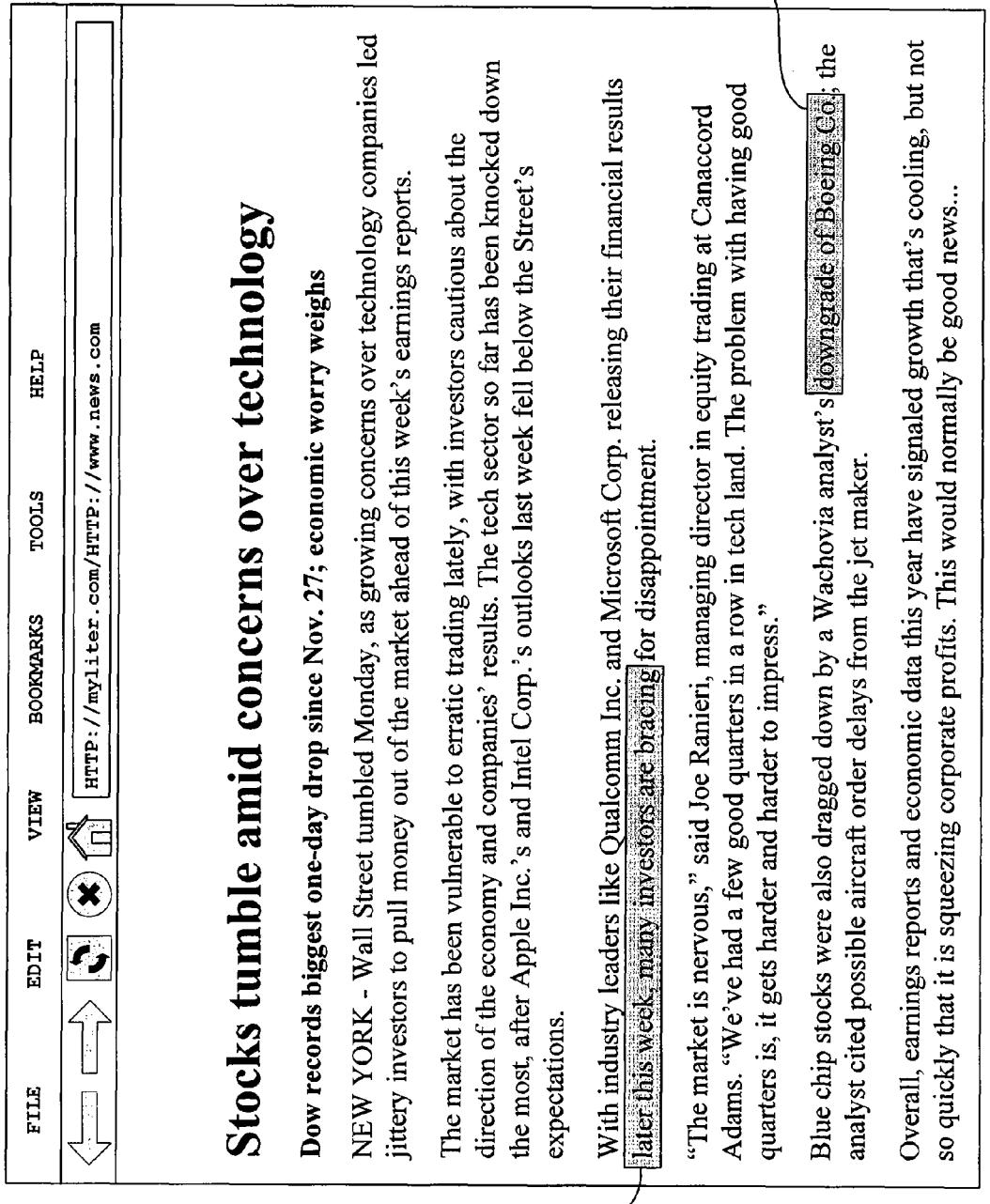
FIG. 10 illustrates an example of a user's home page that has been invoked with a modified address to operate with a highlighting service, according to an embodiment of the invention.

FIG. 10 illustrates an example of a user's home page that has been invoked with a modified address to operate with a highlighting service, according to an embodiment of the invention. As illustrated in FIG. 10, the modified address conforms in format to the one illustrated in FIG. 8. In this example, the web page shows two user-generated highlights 70 and 72, which have been added by a highlighter server.

The foregoing description of various implementations of the invention has been presented for purposes of illustration and description. It is not exhaustive and does not limit the invention to the precise form or forms disclosed. Furthermore, it will be appreciated by those skilled in the art that the present invention may find practical application in a variety of alternative contexts that have not explicitly been addressed herein. In particular, the present invention might be implemented to work in contexts other than a highlighting service. Finally, the illustrative processing steps performed by a computer-implemented program (e.g., instructions) may be executed simultaneously, or in a different order than described above, and additional processing steps may be incorporated. The invention may be implemented in hardware, software, or a combination thereof. When implemented partly in software, the invention may be embodied as a set of instructions stored on a computer-readable medium. The scope of the invention is defined by the claims and their equivalents.

What is claimed is:

1. A computer-implemented method comprising:
responsive to receipt of a uniform resource locater (URL) indicating a home page, said home page being a default start page loaded when a web browser application is initially launched, modifying the URL to specify, in addition to the home page, an address of a highlighting server;

receiving at the highlighting server a first request for the home page, said first request including the URL, and extracting from the URL an address indicating the home page and a host for the home page;

transmitting from the highlighting server to the host a second request for the home page;

receiving from the host at the highlighting server, a copy of the home page and modifying content included in said home page to produce an instance of the home page having one or more highlights;

providing the instance of the home page having one or more highlights to a client from which the first request originated; and continuing to modify URLs of other web pages viewed during a web browsing session at the client so as to employ the highlighting server.

2. The computer-implemented method of claim 1, wherein a toolbar panel is displayed at the client along with the instance of the home page having the one or more highlights.

3. The computer-implemented method of claim 1, wherein the highlighting server enables a user to generate additional highlights, make comments, categorize content, and/or modify prior actions by selecting a portion of the home page.

4. The computer-implemented method of claim 1, wherein the host returns portions of the home page directly to the client.

* * * * *